(12) United States Patent
Markus et al.

(10) Patent No.: US 9,104,714 B2
(45) Date of Patent: Aug. 11, 2015

(54) INCREMENTAL OPTIMISTIC LOCKING OF DATA DISTRIBUTED ON MULTIPLE NODES TO AVOID TRANSACTION DEADLOCK

(75) Inventors: Mircea Markus, London (GB); Manik Surtani, London (GB)

(73) Assignee: Red Hat, Inc., Raleigh, NC (US)

( * ) Notice: Subject to any disclaimer, the term of this patent is extended or adjusted under 35 U.S.C. 154(b) by 367 days.

(21) Appl. No.: 13/484,780

(22) Filed: May 31, 2012

(65) Prior Publication Data
US 2013/0325827 A1  Dec. 5, 2013

(51) Int. Cl.
*G06F 17/30* (2006.01)
(52) U.S. Cl.
CPC .................. *G06F 17/30345* (2013.01)
(58) Field of Classification Search
CPC ..... G06Q 30/08; G06Q 20/401; G06Q 40/04; G06Q 40/06; G06F 17/30359; G06F 17/30362; G06F 17/30351; G06F 17/30345; G06F 2209/521; G06F 8/458; G06F 9/3004; G06F 9/526

USPC .......................................... 707/703
See application file for complete search history.

(56) References Cited

U.S. PATENT DOCUMENTS

2006/0253856 A1* 11/2006 Hu et al. .................. 718/104
2009/0313311 A1* 12/2009 Hoffmann et al. ............ 707/204

* cited by examiner

*Primary Examiner* — Jean B Fleurantin
*Assistant Examiner* — Evan Aspinwall
(74) *Attorney, Agent, or Firm* — Lowenstein Sandler LLP

(57) ABSTRACT

A transaction originator node identifies multiple data elements distributed at multiple enlisted nodes to lock for a transaction managed by the transaction originator node. The transaction originator node determines which of the enlisted nodes is a first enlisted node in a lock order for the transaction and sends an update request to the first enlisted node in the lock order to lock a data element residing at the first enlisted node. The transaction originator node sends update requests to remaining enlisted nodes in the lock order to cache the update requests until the remaining enlisted nodes receive a message to perform a lock.

20 Claims, 9 Drawing Sheets

INCREMENTAL OPTIMISTIC LOCKING OF DATA DISTRIBUTED ON MULTIPLE NODES TO AVOID TRANSACTION DEADLOCK

TECHNICAL FIELD

Embodiments of the present invention relate to transaction deadlock, and more particularly, to incremental optimistic locking of data distributed on multiple nodes to avoid transaction deadlock.

BACKGROUND

The XA (eXtended Architecture) protocol relates to transactions that consist of multiple operations that access resources. For example, a banking application may conduct an XA transaction that consists of two operations (1) deduct money from a first bank account and (2) add money to a second bank account. Typically, either both of the operations relating to the XA transaction will be permanent, if successful, or none of them will be committed.

In traditional data storage systems, consistency is usually achieved by a data locking mechanism to prevent data from being corrupted or invalidated when multiple users try to write to the same data. When a lock of the data is acquired for a transaction, the transaction has access to the locked data until the lock is released. Other transactions may not have access to the locked data. The XA standard uses a two-phase commit (2PC) protocol to ensure that all resources enlisted within a transaction either commit or rollback to a previous state. The first phase is preparation, which may include acquiring a lock on the data for the transaction to prevent other transactions from accessing that data, and updating the values (e.g., deduct money, add money) for the locked data to reflect the transaction. If preparation is successful, the second phase of commitment can be initiated, which may include releasing the locks to allow other transactions access to the data that was updated. A pessimistic locking approach typically acquires locks with each write operation of a transaction. For example, a lock may be acquired when the first bank account balance is changed and a lock may be acquired when the second account balance is changed. In an optimistic locking approach, locks are usually not acquired until during the prepare phase.

A deadlock may occur when two transactions that write to the same data execute concurrently or execute nearly at the same time. A deadlock is a situation wherein two or more competing actions are each waiting for the other to finish, and thus, neither transaction finishes. For example, a first transaction (TX1) wishes to acquire locks on Data-A and Data-B in that order. A second transaction (TX2) wishes to acquire locks on Data-B and Data-A in that order. If the transactions run in parallel, TX1 may obtain a lock on Data-A, and TX2 may obtain a lock on Data-B. TX1 would like to progress and acquire a lock on Data-B, but would not be able to do so since Data-B is already locked by TX2. Similarly, TX2 would try to acquire a lock on Data-A, but would not be able to do so since Data-A is already locked by TX1. Each transaction waits for the other transaction to finish causing a deadlock.

Traditional solutions typically wait for a deadlock to occur and then build a dependency graph describing the dependencies between the deadlocked transactions. Generally, conventional solutions terminate one of the two deadlocked transactions. Such traditional solutions may be quite costly because they involve a large amount of CPU and network usage, which is not ideal. Such solutions are generally also not fast enough in terminating a deadlocked transaction.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1A:
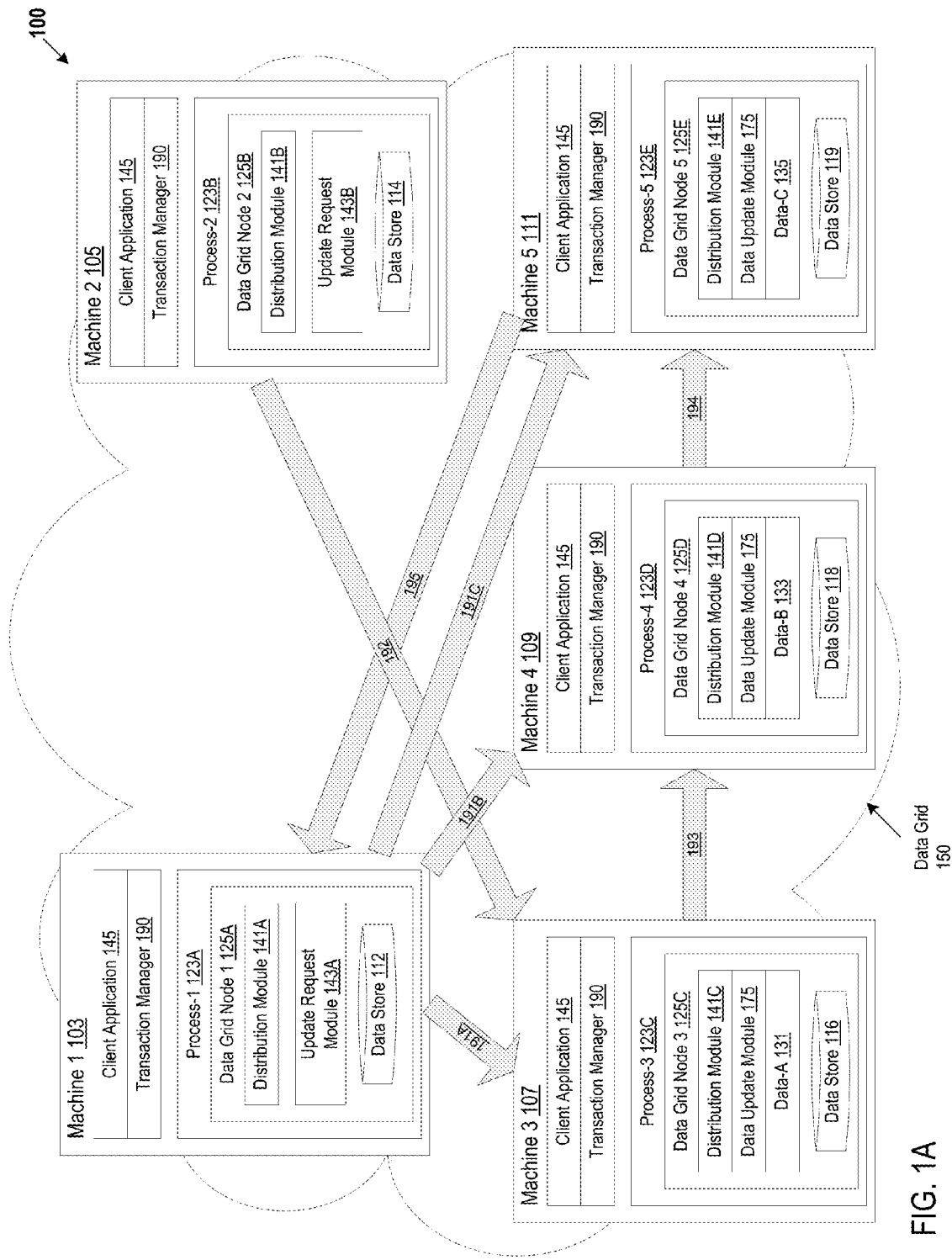
FIGS. 1A-B illustrate exemplary network architectures, in accordance with various embodiments of the present invention.

Described herein are a method and apparatus for incremental optimistic locking of data distributed on multiples nodes to avoid transaction deadlock. A data grid has multiple operating system processes. A process can run a data grid node, which is an instance of a data grid application. A process "owning" transaction data has a capability to perform operations, such as acquiring data locks, updating values, etc. for the transaction. A process that owns transaction data for a transaction is hereinafter referred to as an "enlisted process." A node running in an enlisted process is hereinafter referred to as an "enlisted node." Transaction data may be distributed on multiple enlisted nodes. For example, a transaction may involved Data-A residing on enlisted node-3 (N3), Data-B residing on enlisted node-4 (N4), and Data-C residing on enlisted node-5 (N5).

A process that initiates and manages a transaction is hereinafter referred to as a "transaction originator process." A node running in a transaction originator process is hereinafter referred to as a "transaction originator node." Transaction data for the transaction may not be owned by the transaction originator node and the transaction originator node can communicate with the one or more enlisted nodes which own the transaction data for a transaction.

The data that is owned by an enlisted node can be used by multiple transactions. Transaction originator nodes can send "prepare" requests to enlisted nodes, concurrently or nearly at the same time, to prepare the same data for a commit operation, but for different transactions. For example, a first transaction, which is managed by a first transaction originator node, N1, may involve three operations: (1) deduct money from the balance for a first bank account (e.g., Data-A at N3), (2) add part of the deducted money to the balance of a second bank account (e.g., Data-B at N4), and (3) add part of the deducted money to the balance of a third bank account (e.g., Data-C at N5). A separate second transaction, which is managed by a second transaction originator node, N2, may involve three operations using the same data, but in an order different from the first transaction and using different values, such as (1) deduct money from the balance for the second bank account (e.g., Data-B at N4), (2) deduct money from the balance for the third bank account (e.g., Data-C at N5), and (3) add the deducted monies to the balance of the first bank account (e.g., Data-A at N3).

To avoid transaction deadlock, in one embodiment, when any of the transaction originator nodes, N1 and/or N2, are ready to make changes to the distributed transaction data elements (e.g., Data-A, Data-B, Data-C) at the enlisted nodes (e.g., N3, N4, N5), the transaction originator node(s) can identify the data to lock for the transaction, determine a lock order in which the enlisted nodes should obtain data locks, and determine which of the enlisted nodes is a first enlisted node in the lock order. The locks to the transaction data elements can be made incrementally. The first enlisted node can attempt to lock the corresponding data. If the first enlisted node is successful, the other enlisted nodes can sequentially lock the corresponding data based on the lock order until all of the data for the transaction has been locked. The first enlisted node for the first transaction should match the first enlisted node in a lock order for other transactions, such as the second transaction. For example, N1 and N2 may determine that N3 is the first enlisted node followed by N4 and N5 in the lock order for each corresponding transaction.

Embodiments avoid deadlocks by ensuring that transactions attempting to update the same data use the same first enlisted node. Embodiments reduce processing time by avoiding unwarranted waiting periods.

FIG. 1A is an exemplary network architecture 100 in which embodiments of the present invention can be implemented. The network architecture 100 can include multiple machines 103,105, 107,109,111 connected via a network (not shown). The network may be a public network (e.g., Internet), a private network (e.g., a local area network (LAN)), or a combination thereof.

The machines 103,105,107,109,111 may be configured to form a data grid 150. Data grids are an alternative to databases. A data grid 150 distributes data across multiple operating system processes. The operating system processes can run an instance of a data grid application and can use a distribution algorithm to determine which processes in the data grid 150 are enlisted nodes that have the data for a transaction. Each process can own data and allow other processes access to the data.

Machines 103,105,107,109,111 may be hardware machines such as desktop computers, laptop computers, servers, or other computing devices. Each of the machines 103, 105,107,109,111 may include an operating system that manages an allocation of resources of the computing device. In one embodiment, one or more of the machines 103,105,107, 109,111 is a virtual machine. For example, one or more of the machines may be a virtual machine provided by a cloud provider. In some instances, some machines may be virtual machines running on the same computing device (e.g., sharing the same underlying hardware resources). In one embodiment, one or more of the machines 103,105,107,109,111 is a Java Virtual Machine (JVM), which may run on a hardware machine or on another virtual machine.

Machines 103,105,107,109,111 each include one or more processes 123A-E. A process 123A-E is an operating system process (e.g., a Java Virtual Machine instance). A process 123A-E can run a data grid node (also hereinafter referred to a "node") 125A-E, which is an instance of a data grid application. A process 123A-E runs one data grid node 125A-E. For example, Process-1 123A runs data grid node 125A. A machine 103,105,107,109,111 can run more than one process 123A-E and a corresponding data grid node 125A-E.

Each data grid node 125A-E may act as a server to clients and as a peer to other data grid nodes 125A-E. An in-memory data grid 150 may rely on main memory for data storage. In-memory data grids 150 are faster than disk-optimized data grids since disk interactions are generally much slower than in-memory interactions. For brevity and simplicity, an in-memory data grid 150 is used as an example of a data grid throughout this document.

In one embodiment, the in-memory data grid 150 operates in a client-server mode, in which the in-memory data grid 150 serves resources (e.g., a stateful data store 112,114,116,118, 119 such as a cache) to client applications 145. In one embodiment, a machine 103,105,107,109,111 is a client machine hosting one or more applications 145. An application 145 can be any type of application including, for example, a web application, a desktop application, a browser application, etc. An application 145 can be hosted by one or more machines 103,105,107,109,111. In one embodiment, the in-memory data grid 150 acts as a shared storage tier for client applications 145. A separate memory space may be generated for each client application 145. In one embodiment, a client application 145 runs outside of the virtual machines (e.g., machines 103,105,107,109,111) of the data grid nodes 125A-E. In another embodiment, a client application 145 runs in the same virtual machine as a data grid node 125A-E. In another embodiment, a client application 145 may not be a Java-based application and may not be executed by a Java Virtual Machine.

A process 123A-E in the data grid 150 may execute data operations, such as to store objects, to retrieve objects, to perform searches on objects, etc. Unlike a database, the in-memory data grid 150 distributes stored data across data stores 112,114,116,118,119 (e.g., cache-nodes, grid-nodes) in the multiple processes 123A-E. The in-memory data grid 150 can include a volatile in-memory data structure such as a distributed cache. Each process 123A-E can maintain a data store 112,114,116,118,119 (e.g., cache-node, grid-node). In one embodiment, the data grid 150 is a key-value based storage system to host the data for the in-memory data grid 150 in the data stores 112,114,116,118,119.

The key-value based storage system (e.g., data grid 150) can hold and distribute data objects based on a distribution algorithm (e.g., a consistent hash function). For example, the data grid 150 may store bank account objects with a key-value model of (accountNumber, accountObject). The data grid 150 can store a particular key-value pair by using a distribution algorithm to determine which of the processes 123A-E stores the particular value for the key-value pair and then place the particular value within that process. Each process 123A-E of the data grid 150 can use the distribution algorithm to allow key look up.

A client application 145 can initiate a transaction by communicating a start of a transaction to a transaction manager 190. A transaction manager 190 communicates with a client application 145 and with the various processes 123A-E in the data grid 150 to manage the transaction. In one embodiment, each of the processes 123A-E includes a transaction manager 190 to allow a client application 145 to initiate a transaction with any process 123A-E in the data grid 150.

When a client application 145 is writing data to the data grid 150, the client application 145 can connect to a transaction manager 190 of the transaction originator node it is working with in the data grid 150 and provide the key-value pair (e.g., accountNumber, BankAccount instance) to the transaction manager 190. For example, a client application 145 may connect to transaction originator node, N1 (125A), which is managing a first transaction TX1 to deduct money from a bank account (e.g., Data-A 131), and passes a key-value pair for Data-A (131) to the transaction originator N1 (125A) to change the data in the data grid 150.

A transaction can be a multi-operational transaction, such as an XA (eXtended Architecture) transaction. For brevity and simplicity, an XA transaction is used as an example of a multi-operational transaction throughout this document. For example, a transaction may involve three operations: (1) deduct money from the balance for a first bank account (e.g., Data-A at N3), (2) add part of the deducted money to the balance of a second bank account (e.g., Data-B at N4), and (3) add part of the deducted money to the balance of a third bank account (e.g., Data-C at N5).

The XA standard uses a two-phase commit (2PC) protocol to ensure that all resources enlisted within a transaction either commit or rollback to a previous state. The first phase is preparation, which may include acquiring a lock on the data for the transaction to prevent other transactions from accessing that data, and updating the values (e.g., deduct money, add money) for the locked data to reflect the transaction. If preparation is successful, the second phase of commitment can be initiated in the data grid 150, which may include releasing the locks to allow other transactions access to the data that was updated. For example, a banking application (e.g., client application 145) may wish to conduct a transaction that consists of two operations: (1) deduct money from the first bank account, and (2) add the deducted money to a second bank account. Before any of the write operations are committed to the data grid 150, the success of performing of each write operation is first determined.

Transaction originator nodes and enlisted nodes in the data grid 150 can use optimistic locking to ensure that either all of the operations for a transaction successfully happen or none of them are committed. In an optimistic locking approach, locks are usually not acquired until during the prepare phase.

The data in the enlisted nodes (e.g., N3, N4, N5) can be used by multiple transactions. For example, a client application 145 may connect to another transaction originator node, N2, which is managing a second transaction to (1) deduct money from the balance for the second bank account (e.g., Data-B at N4), (2) deduct money from the balance for the third bank account (e.g., Data-C at N5), and (3) add the deducted monies to the balance of the first bank account (e.g., Data-A at N3). The client application 145 may pass the key-value pairs for Data-A (131), Data-B (133), and Data-C (135) to the transaction originator node N2 (125B) to change the data in the data grid 150.

Data consistency in the data grid 150 can be achieved by a data locking mechanism to prevent data from being corrupted or invalidated when multiple transactions try to write to the same data. When a lock of the data is acquired for a transaction, the transaction has access to the locked data until the lock is released. Other transactions may not have write access to the locked data.

A deadlock may occur when two transactions (e.g., TX1, TX2) that write to the same data (e.g., Data-A 131, Data-B 133, Data-C 135) execute concurrently or nearly at the same time. To avoid deadlock, the transaction originator nodes (e.g, N1 125A, N2 125B) can include an update request module 143A,B to determine a lock order in which the enlisted nodes should obtain locks. For example, the update request modules 143A,B in the transaction originator nodes (e.g, N1 125A, N2 125B) determine that N3 (125C) is the first enlisted node, followed by N4 (125D) and N5 (125E). One embodiment of the update request module determining the lock order in which the enlisted nodes should obtain locks is described in greater detail below in conjunction with FIG. 3.

The update request modules 143A,B can send 191A,192 an update request for their corresponding transactions (e.g., TX1, TX2) to the first enlisted node (e.g., N3 125C) to update the data (e.g., Data-A 131) at the first enlisted node. In one embodiment, the update request modules 143A,B multi-cast an update request to all of the enlisted nodes associated with the transaction at the same time. For example, the update request module 143A sends 191A,B,C an update request to the all of the enlisted nodes pertaining to the first transaction. The update request sent 191A to the first enlisted node can include an indicator that the first enlisted node should obtain a lock on the corresponding data (e.g., Data-A 131). The update requests sent 191A,B,C to the second enlisted node and the third enlisted node can include an indicator that the second enlisted node and the third enlisted node should cache the corresponding update request until a message to perform the lock is received In one embodiment, the enlisted nodes (e.g., N3 125C, N4 125D, N5 125E) include a data update module 175 to receive 191A,192 the update requests from transaction originator nodes (e.g., N1, N2) and manage the requests to avoid a deadlock between the multiple transactions. For example, the data update module 175 may receive 191A an update request for TX1 from N1 125A to lock Data-A 131. The data update module 175 may receive 192 an update request for TX2 from N2 125B to lock the same Data-A 131 and may place the second update request in a queue. For the update request from N1 125A, the data update module 175 in N3 125C can lock Data-A 131 and may also update Data-A 131, and send 193 a message to the next enlisted node, N4 125D, to obtain a lock on Data-B 133. The data update module 175 in N4 125D can lock Data-B 133 and may also update Data-B 133, and send 194 a message to the next enlisted node, N5 125E, to obtain a lock on Data-C 135. The data update module 175 in N5 125E can lock Data-C 135 and may also update Data-C 135, and send 195 a message to the update request module 143A in the transaction originator node, Node 1 125A, indicating the locks have been made. In one embodiment, the enlisted node update the data after all of the locks have been made. A process 123A-E can include a distribution module 141A-E to determine, based on the key (i.e., accountNumber) and a distribution algorithm, which node(s) in the data grid 150 are the enlisted nodes where the data is stored. One embodiment of the enlisted nodes sending a message to a next enlisted node is described in greater detail below in conjunction with FIG. 5.

When the enlisted nodes (e.g., N3, N4, N5) have locked and/or updated their corresponding data, the update request module 143A in the transaction originator node can send a message to the enlisted nodes to release the lock on the corresponding data. If the data update module 175 in the first enlisted node (e.g., N3) has another update request in its queue (e.g., request received 192 from N2), the data update module 175 can process the request since the lock on the data (e.g., Data-A 131) has been released.

Figure 1B:
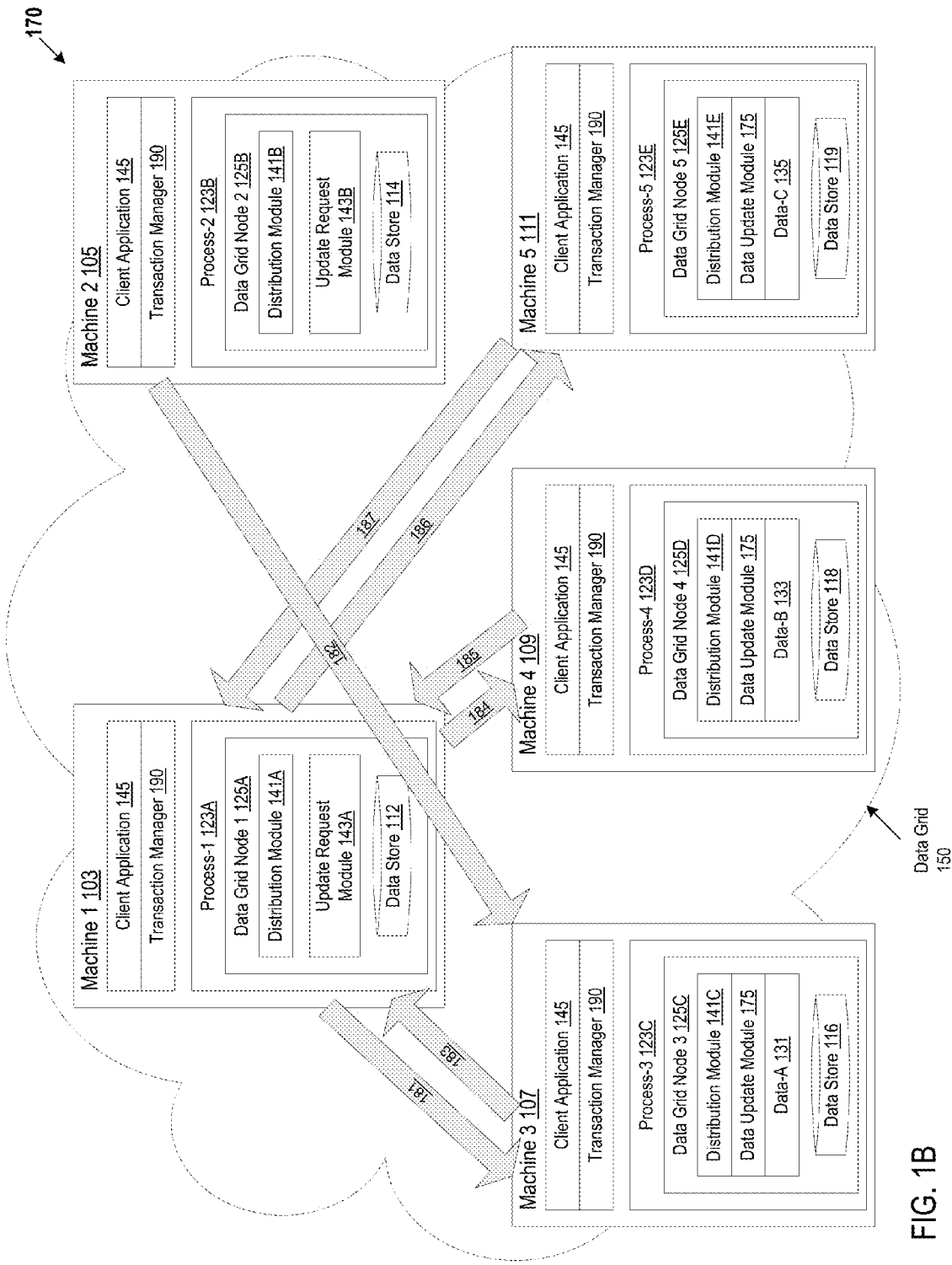

FIG. 1B is an exemplary network architecture 180 in which embodiments of the present invention can be implemented. The update request modules 143A,B in the transaction originator nodes (e.g, N1, N2) send 181,182 an update request for their corresponding transactions (e.g., TX1, TX2) to the first enlisted node (e.g., N3) to update the data (e.g., Data-A 131) at the first enlisted node. The data update module 175 in the first enlisted node (e.g., N3) may place the second update request in a queue. For the update request from N1 (125A), the data update module 175 in N3 can lock Data-A 131 and may also update Data-A 131, and send 183 a message to the update request module 143A indicating that the data lock was acquired. The update request module 143A can send 184 an update request to the next enlisted node N4 (125D). The data update module 175 in N4 can lock Data-B 133 and may also update Data-B 133, and send 185 a message to the update request module 143A indicating that the data lock was acquired. The update request module 143A can send 186 an update request to the next enlisted node N5 (125E). The data update module 175 in N5 can lock Data-C 135 and may also update Data-C 135, and send 186 a message to the update request module 143A indicating that the data lock was acquired. In one embodiment, the enlisted nodes update the data when all of the locks have been acquired. The update request module 143A can send a message to the enlisted nodes (e.g., N3, N4, N5) to release the corresponding locks. If the data update module 175 in the first enlisted node (e.g., N3) has another update request in its queue (e.g., request received 192 from N2), the data update module 175 can process the request since the lock on the data (e.g., Data-A 131) has been released.

Figure 2:
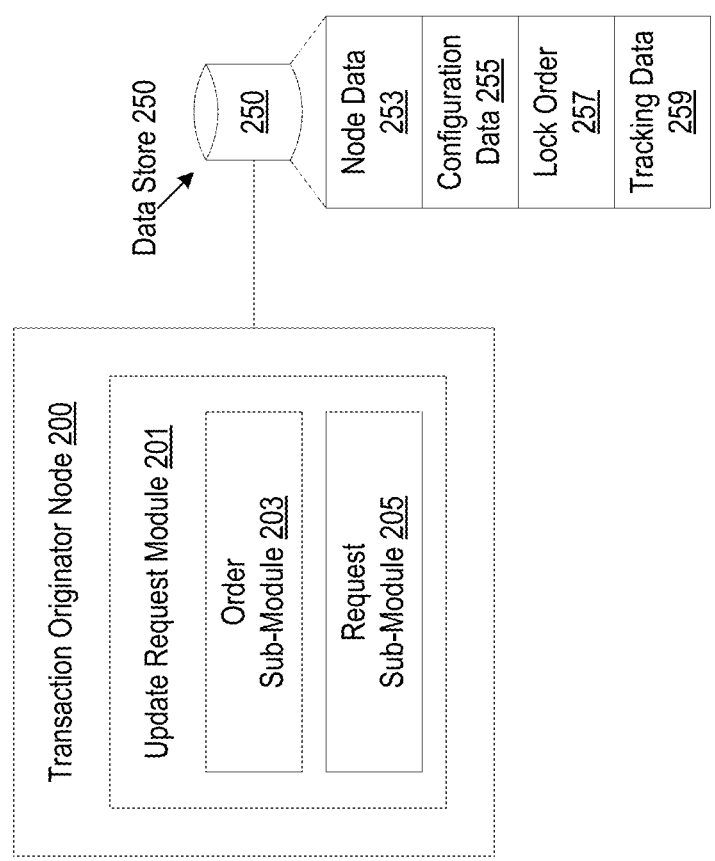
FIG. 2 is a block diagram of an embodiment of an update request module in a transaction originator node.

FIG. 2 illustrates a block diagram of one embodiment of an update request module 201 in a transaction originator node 200. The transaction originator node 200 may correspond to process 123A and data grid node 125A running in machine 103 of FIG. 1 and/or to process 123B and data grid node 125B running in machine 105 of FIG. 1. The transaction originator node 200 includes an update request module 201. The update request module 201 can include an order sub-module 203 and a request sub-module 205.

The order sub-module 203 can receive a request to update data in the data grid for a transaction. The request can be received from a client application (e.g., client application 145 in FIG. 1). The order sub-module 203 can use data identifiers (e.g., keys) in the request and a distribution algorithm in the request to identify which nodes in the data grid are the enlisted nodes that own the data elements for the transaction.

The order sub-module 203 can create a lock order in which the enlisted nodes should lock the data elements for the transaction that is distributed on the enlisted nodes. In one embodiment, the order sub-module 203 accesses node data 253 in a data store 250 that is coupled to the order sub-module 203 to create the lock order for the transaction. The node data 253 can be a list of the nodes in the data grid. The order sub-module 203 can identify the order of the enlisted nodes based on the corresponding positions of the enlisted nodes in the list. In another embodiment, the order sub-module 203 determines a hash value for each of the enlisted nodes using a node identifier corresponding to each of the enlisted nodes and ranks the enlisted nodes based on the hash values. The order sub-module 201 can use a non-cryptographic hash function. In one embodiment, the order sub-module 201 uses a Murmur Hash function. The order sub-module 203 can select a first enlisted node in the lock order based on configuration data 255 that is stored in the data store 250. Embodiments of determining which of the enlisted nodes is the first enlisted node is described in greater detail below in conjunction with FIG. 3. The order sub-module 203 can store the lock order 257 in the data store 250.

The request sub-module 205 can send an update request to the enlisted nodes requesting that data be locked. The request can include a request to also update the locked data. The request can include a key-value pair identifying the data to be updated and the value to use to update the data. The request can include a transaction identifier and the lock order of the enlisted nodes. The request sub-module 205 can create an indicator in the request indicating whether an enlisted node should attempt to lock the corresponding data or whether to cache the update request until a message to lock the data is received. The indicator can be a flag. For example, the request sub-module 205 can send an update request to the first enlisted node with a start flag enabled to indicate that the first enlisted node should attempt to lock and update the data. The request sub-module 205 can send an update request to the other enlisted nodes in the lock order with, for example, the start flag disabled indicating that the other enlisted nodes should cache the corresponding update request.

The request sub-module 205 can determine whether an acknowledgment is received from the enlisted nodes indicating that the corresponding lock was acquired. The acknowledgment can also indicate whether an update to the data was successfully made. The request sub-module 205 can store tracking data 259 in the data store 259 to track which enlisted nodes have sent an acknowledgment. The request sub-module 205 can send a message to enlisted nodes that have made an update to the data to rollback the data to a previous state. The request sub-module 205 can send a message to enlisted nodes that have locks on the data to release the locks on the data.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
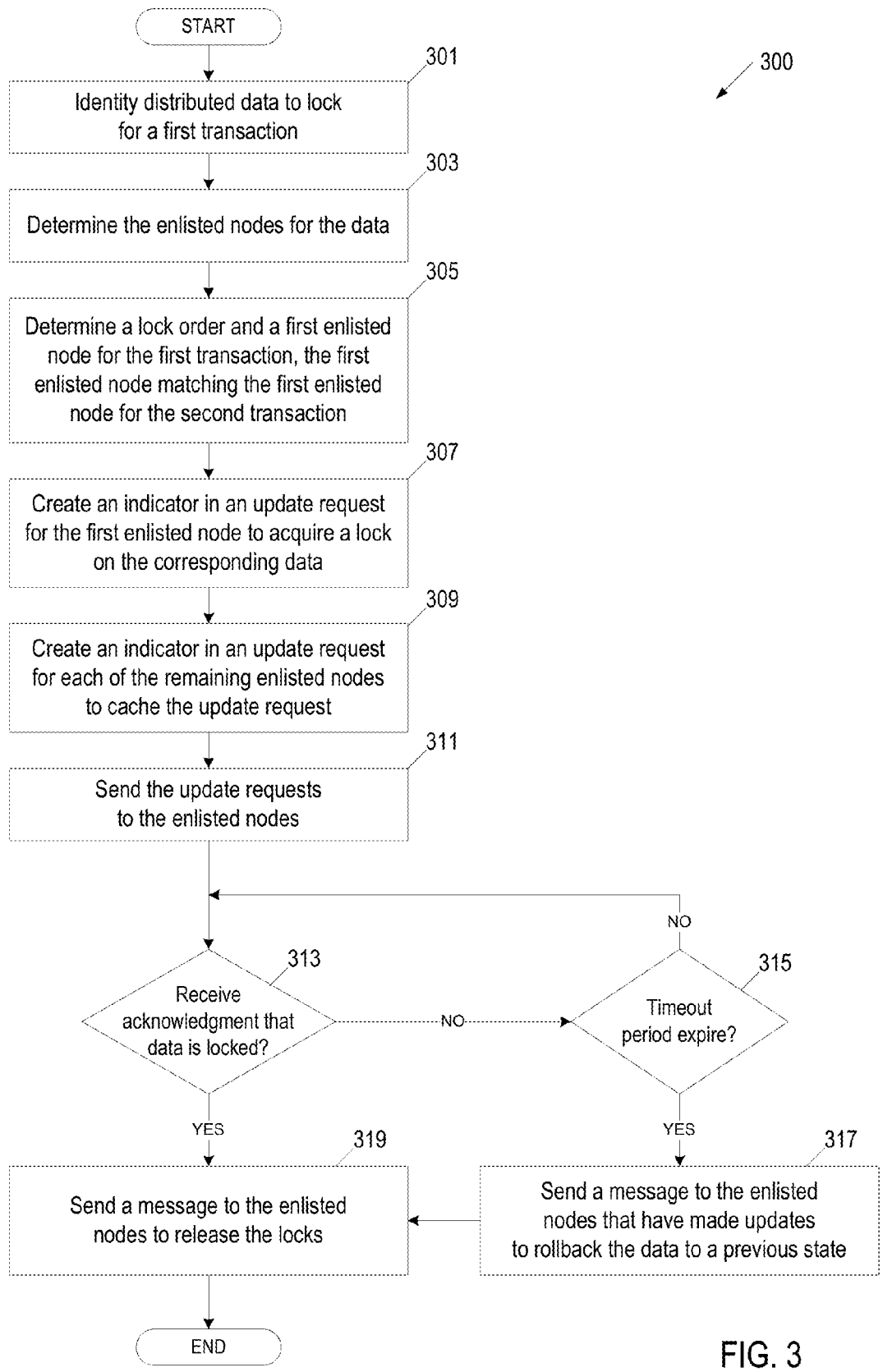
FIG. 3 is a flow diagram illustrating an embodiment for a method of using a lock order to incrementally lock transaction data that is distributed on multiple nodes to avoid transaction deadlock.

FIG. 3 is a flow diagram of an embodiment of a method 300 of a transaction originator node using a lock order to incrementally lock transaction data that is distributed on multiple nodes to avoid transaction deadlock. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by an update request module 143A in a transaction originator node 125A executing in a machine 103 and/or by an update request module 143B in a transaction originator node 125B executing in a machine 105 of FIG. 1.

At block 301, processing logic identifies data elements distributed at multiple enlisted nodes to lock for a first transaction. Processing logic can receive a request, for example, from a client application. The transaction data matches data for a second transaction managed by another transaction originator node. At block 303, processing logic determines the enlisted nodes for the distributed data. The request from the client application can include key-value pairs that identify the data that is to be updated. Processing logic can use the keys in the key-value pairs and an algorithm to identify which nodes in the data grid are the enlisted nodes that own the data for the keys. For example, processing logic may determine that N3 owns Data-A, N4 owns Data-B and N5 owns Data-C, which are to be updated for the transaction. In one embodiment, the algorithm is a non-cryptographic hash function. In one embodiment, the algorithm is a consistent hash algorithm. In one embodiment, the algorithm is a Murmur Hash function.

At block 305, processing logic determines which of the enlisted nodes (e.g., N3, N4, and N5) is the first enlisted node in a lock order in which the enlisted nodes should obtain locks. The first enlisted node for the first transaction matches a first enlisted node for other transactions. In one embodiment, processing logic identifies the first enlisted node based on the positions in a list of the nodes in the data grid. In one embodiment, processing logic searches for the enlisted nodes in the list and selects the enlisted node having a position closest to the top of the list as the first enlisted node. In another embodiment, processing logic searches for the enlisted nodes in the list and selects the enlisted node having a position closest to the bottom of the list as the first enlisted node. Processing logic can select the first enlisted based on configuration data that is stored in a data store that is coupled to the update request module. For example, the configuration data specifies that the enlisted node having the lowest index is the first enlisted node.

In another embodiment, processing logic determines a hash value for each of the enlisted nodes (e.g., N3, N4, N5) using a node identifier or a key identifier corresponding to each of the enlisted nodes and ranks the enlisted nodes based on the hash values. In one embodiment, the algorithm is a non-cryptographic hash function. In one embodiment, the algorithm is a consistent hash algorithm. In one embodiment, the algorithm is a Murmur Hash function. In one embodiment, processing logic orders the hash values from a least hash value to a greatest hash value. In another embodiment, processing logic orders the hash values from a greatest hash value to a least hash value. In one embodiment, processing logic selects the enlisted node having the greatest hash value as the first enlisted node. In one embodiment, processing logic selects the enlisted node having the smallest hash value as the first enlisted node. Processing logic can determine the first enlisted node based on configuration data that is stored in a data store that is coupled to the update request module.

At block 307, processing logic creates an indicator in the update request for the first enlisted node to acquire a lock on the corresponding data. The update request can include a request to update the locked data. For example, processing logic enables a start flag in the update request for the first enlisted node. At block 309, processing logic creates an indicator in the update requests for the other enlisted nodes in the lock order to cache the update request when the request is received by a corresponding enlisted node until a message to perform the lock is received. For example, processing logic disables a start flag in the update requests for the other enlisted nodes. At block 311, processing logic sends the update requests to the first enlisted node and the other enlisted nodes in the lock order. The request can include a key-value pair identifying the data to be updated, the value to use to update the data, and the lock order of the enlisted nodes for the transaction. The request can include a transaction identifier.

At block 313, processing logic determines whether there is an acknowledgment received from all of the enlisted nodes indicating that the lock acquired. The acknowledgment can also indicate whether a data update was made. Processing logic can store tracking data in a data store that is coupled to the data controller module to determine whether an acknowledgment is received from all of the nodes. If processing logic receives a successful acknowledgment from all of the enlisted nodes (block 313), processing logic sends a message to the enlisted nodes to release the locks at block 319. If processing logic does not receive a successful acknowledgment from all of the enlisted nodes (block 313), processing logic determines whether a timeout period has expired at block 315. Processing logic can use a timeout period from configuration data that is stored in the data store. The timeout period can be user-defined. If a timeout period has not expired (block 315), processing logic returns to block 313, to determine whether a successful acknowledgment is received from all of the enlisted nodes. If a timeout period has expired (block 315), processing logic sends a message to the enlisted nodes that have made updates to corresponding transaction data to rollback the value to a previous state at block 317. For example, one of the enlisted nodes may experience a system failure and may not have successfully updated the transaction data at the enlisted node. Processing logic sends a message to the enlisted nodes to rollback to the previous state to preserve data consistency. At block 319, processing logic sends a message to the enlisted nodes to release the locks.

Figure 4:
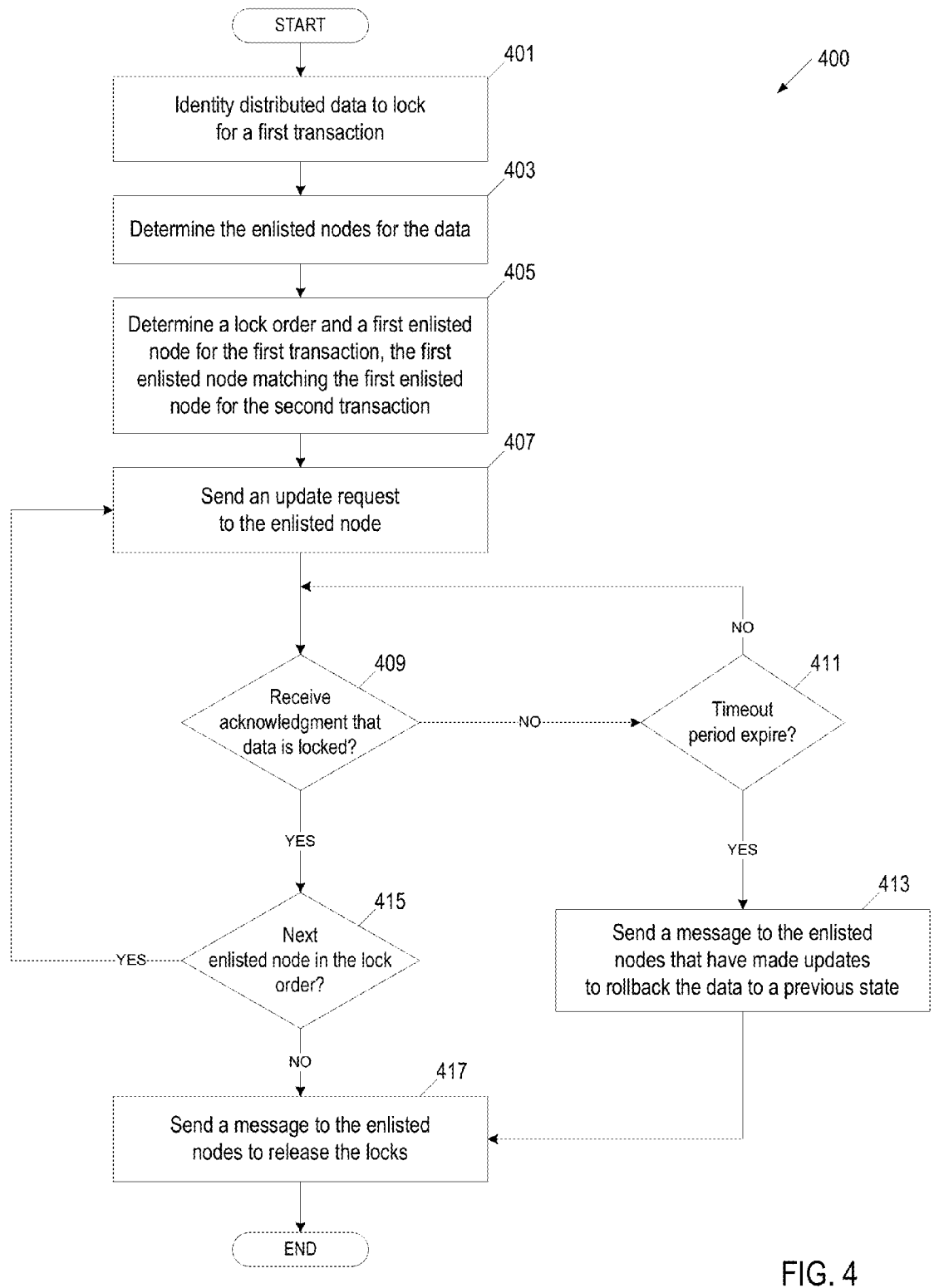
FIG. 4 is a flow diagram illustrating an embodiment for a method of using a lock order to incrementally lock transaction data that is distributed on multiple nodes to avoid transaction deadlock.

FIG. 4 is a flow diagram of another embodiment of a method 400 of a transaction originator node using a lock order to incrementally lock transaction data that is distributed on multiple nodes to avoid transaction deadlock. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by an update request module in a transaction originator node executing in a machine of FIG. 1.

At block 401, processing logic identifies data that is distributed on multiple enlisted nodes to update for a first transaction. The distributed data matches data for one or more other transactions managed by other transaction originator nodes. At block 403, processing logic determines the enlisted nodes for the data. At block 405, processing logic determines a lock order in which the enlisted nodes should obtain locks and which of the enlisted nodes is the first enlisted node in the lock order. The first enlisted node for the first transaction should match a first enlisted node for other transactions. Processing logic can store the lock order in a data store that is coupled to the update request module.

At block 407, processing logic sends an update request to the first enlisted node. The request can include a key-value pair identifying the data to be lock. The key-value pair also identifies the data to updated. The request can include the value to use to update the data. At block 409, processing logic determines whether there is an acknowledgment received from the enlisted node indicating that the lock was acquired. The acknowledgment can also indicate whether an update to the data was made successfully. If processing logic does not receive a successful acknowledgment (block 409), processing logic determines whether a timeout period has expired at block 411. If a timeout period has not expired (block 411), processing logic returns to block 409, to determine whether a successful acknowledgment is received from the enlisted node. If a timeout period has expired (block 411), processing logic sends a message to the enlisted nodes that have made updates to corresponding transaction data to rollback the value to a previous state at block 413. At block 417, processing logic sends a message to the enlisted nodes to release the locks.

If processing logic receives a successful acknowledgment from the enlisted node (block 409), processing logic determines whether there is a next enlisted node in the lock order at block 415. Processing logic can examine the stored lock order. If there is a next enlisted node in the lock order (block 415), processing logic returns to block 407 to send an update request to the next enlisted node. If there is not a next enlisted node in the lock order (block 415), processing logic sends a message to the enlisted nodes to release the locks at block 417.

Figure 5:
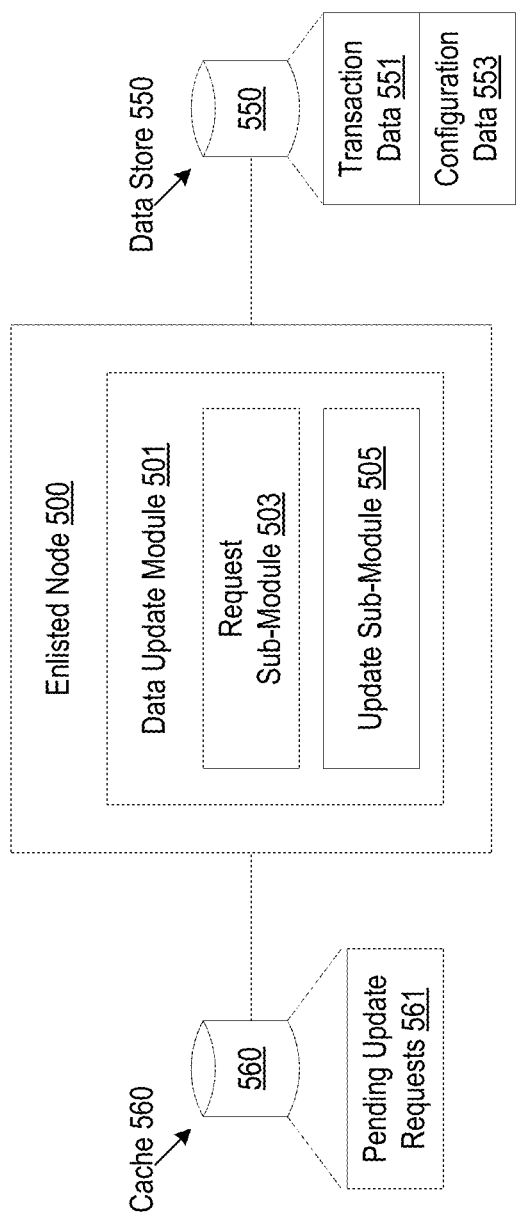
FIG. 5 is a block diagram of an embodiment of a data update module in an enlisted node.

FIG. 5 illustrates a block diagram of one embodiment of a data update module 501 in an enlisted node 500. The enlisted node 500 may correspond to enlisted process 123C and data grid node 125C running in machine 107, enlisted process 123D and data grid node 125D running in machine 109 and enlisted process 123E and data grid node 125E running in machine 1111 of FIG. 1. The enlisted node 500 includes a data update module 501. The data update module 501 can include a request sub-module 503 and an update sub-module 505.

The data store 550 is coupled to the enlisted node 500 and can store transaction data 551 that can be used by multiple transactions. The transaction data 551 is data that is owned and maintained by the enlisted node 500. The transaction data 551 can include key-value pairs. The transaction data 551 can be used by multiple transactions concurrently or nearly at the same time. The data store 550 can be a cache or a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The request sub-module 503 can receive update requests from transaction originator nodes to lock data for a transaction. The request can include a request to update the locked data. The request sub-module 503 can receive messages, such as update requests, from enlisted nodes to lock and/or update data for a transaction. The request sub-module 503 can add pending update requests 561 to a cache 560 that is coupled to the request sub-module 503. The cache 560 can include a queue. For example, the request sub-module 503 may receive an update request from a first transaction originator node for TX1 and may concurrently or nearly at the same time receive an update request from a second transaction originator node for TX2. The request sub-module 503 can process the request for TX1 and add the request for TX2 to the queue 561, or vice-versa.

In another example, the request sub-module 503 receives an update request from a transaction originator node or a message from an enlisted node that includes an indicator indicating whether to cache the update request or to lock and/or update the data. Examples of an indicator can include, and are not limited to, a start flag that is disabled to indicate that the request should be cached and a start flag that is enabled to indicate to lock and/or update the data. The messages from the enlisted nodes and the update requests from the transaction originator nodes can be a network call (e.g., remote procedure call (RPC)). The messages from the enlisted nodes and the update requests from the transaction originator nodes can include one or more keys identifying the transaction data 551 to be updated and a new value for each key. The update requests and messages can include a request to acquire a lock on the transaction data 551 for the requested keys and/or to update the values associated with the keys using the new values in the update request and/or messages.

The request sub-module can receive an update request from a transaction originator node or a message from an enlisted node that includes an indicator indicating to perform a cached request and the update sub-module 505 can perform a cached request. An example of an indicator can include, and is not limited to, a start flag that is enabled to indicate that the cached request should be performed.

The request sub-module 503 can send a message to a next enlisted node to update the corresponding transaction data at the next enlisted node. The request sub-module 503 can examine a lock order in the update request received from a transaction originator node and/or a message received from an enlisted node to determine whether the is a next enlisted node in the order to obtain a lock. The request sub-module 503 can use a data identifier (e.g., key) from the update request and/or message and a distribution algorithm to identify which node in the data grid is the next enlisted node to lock data.

The update sub-module 505 can acquire a lock on the transaction data 551 and can update the current value for a key in the transaction data 551 based on the new value received in the update request and/or message. The update sub-module 505 can use the key-pair in the update request and/or message to update the data. The update sub-module 505 can send a message to the transaction originator node indicating whether the data at the corresponding enlisted node has been successfully locked and/or updated. In one embodiment, the update sub-module 505 uses a timeout period to determine whether to lock the data 551. The timeout period can be stored in configuration data 553 in the data store 550. The update sub-module 505 may receive a message from the transaction originator node to rollback the value of the data to a previous state. The update sub-module 505 can rollback the value of the data to a previous state.

The update sub-module 505 can release the lock on the transaction data 551 to allow other transactions access to the updated transaction data 551. When the update sub-module 505 releases the lock on the transaction data 551, the request sub-module 503 can check the queue 560 to determine whether there is a pending update request 561 to be processed and process the pending request 561.

Figure 6:
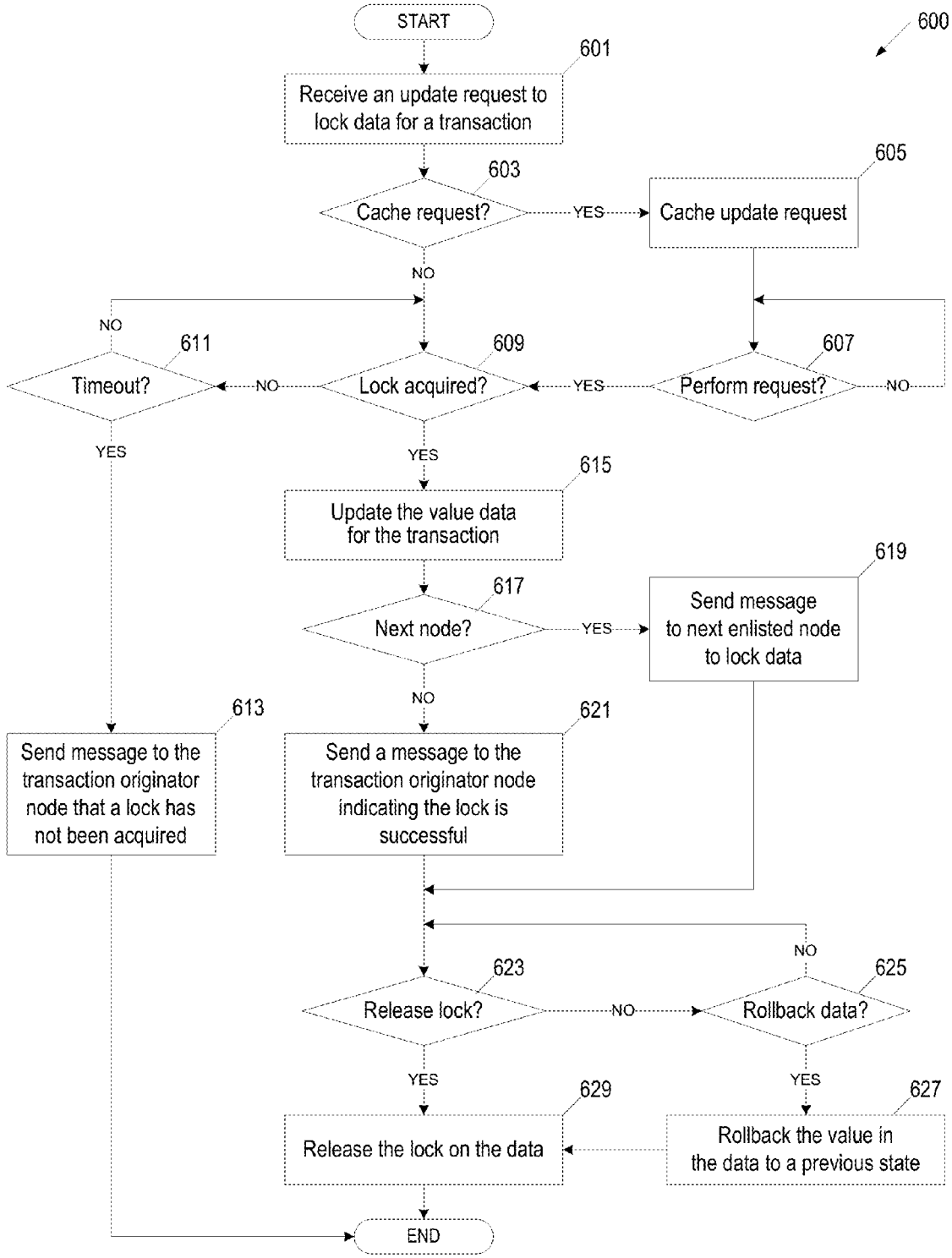
FIG. 6 is a flow diagram illustrating an embodiment for a method of locking transaction data based on a locking order and cache to avoid transaction deadlock.

FIG. 6 is a flow diagram of an embodiment of a method 600 of an enlisted node locking transaction data based on a locking order and cache to avoid transaction deadlock. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by a data update module 175 in an enlisted node 125C executing in a machine 107, an enlisted node 125D executing in a machine 109, and/or an enlisted node 125E executing in a machine 111 of FIG. 1.

At block 601, processing logic receives an update request to lock data for a transaction. The update request can include a request to update the locked data. The data for the transaction is distributed on multiple enlisted nodes. The request can be received from a transaction originator node. Processing logic can receive the update request via a network call over the network. Processing logic may receive another update request from a different transaction originator node for a different transaction that uses the same transaction data during the execution of method 600 and may add the request to a queue.

At block 603, processing logic determines whether to perform the update or to cache the update request until a message to lock the data is received. Processing logic can examine the update request to determine whether an indicator indicates that the update request should be cached. For example, the update request may have a start flag that is disabled. If the update request should be cached (block 603), processing logic can cache the update request at block 605. At block 607, processing logic determines whether a message to perform the cached request is received. The message can be received from a preceding enlisted node in the lock order that has already locked and/or updated corresponding transaction data. If a message is not received from a preceding enlisted node (block 607), processing logic continues to wait until a message is received. If a message is received to perform the cached request, processing logic can attempt to acquire a lock on the data at block 609.

If the update request should not be cached (block 603), processing logic attempts to lock the data at block 609. If a lock is not acquired (block 609), for example, because there is an existing lock on the key by another transaction, processing logic waits and determines whether a timeout period has expired at block 611. If the timeout period has not expired (block 611), processing logic continues to wait until the existing lock on the key is released at block 609. If the timeout period has expired (block 611), processing logic sends a message to the transaction originator node indicating that a lock has not been acquired at block 613. If a lock is acquired (block 609), processing logic updates the value in the data for the transaction using the key-pair received in the update request at block 615. The request can include the key that corresponds to the data that should be locked and the corresponding new value for the key. The key that should be locked corresponds to a key related to a write operation.

At block 617, processing logic determines whether there is a next enlisted node in the lock order. Processing logic can examine the lock order in the update request. If there is not a next enlisted node (block 617), processing logic sends a message to the transaction originator node indicating that the lock and/or update is successful at block 621. If there is a next enlisted node in the lock order (block 617), processing logic sends a message to the next enlisted node to lock and/or update the corresponding data at the next enlisted node at block 619. Processing logic can use the lock order in the request to identify which is the next enlisted node. Processing logic can send a message that includes the key and the new value for the key. The message can be a network call (e.g., remote procedure call (RPC)).

At block 623, processing logic determines whether to release the lock. Processing logic may receive a message from the transaction originator node to release the lock. If a message to release the lock is not received (block 623), processing logic determines whether a message to rollback the data is received at block 625. Processing logic may receive a message from the transaction originator node to rollback the data. If a message to rollback the data is not received (block 625), processing logic returns to block 623. If a message to rollback the data is received (block 625), processing logic rolls back the data to a previous state at block 627. If a message to release the lock is received (block 623) or if the data has been rolled back (block 627), processing logic releases the lock on the data at block 629.

Processing logic may receive another update request for another transaction that uses the same data as the first transaction and/or processing logic may determine that there is another update request in the queue to update data for another transaction that uses the same data as the first transaction. Processing logic may execute method 600 for the next update request.

Figure 7:
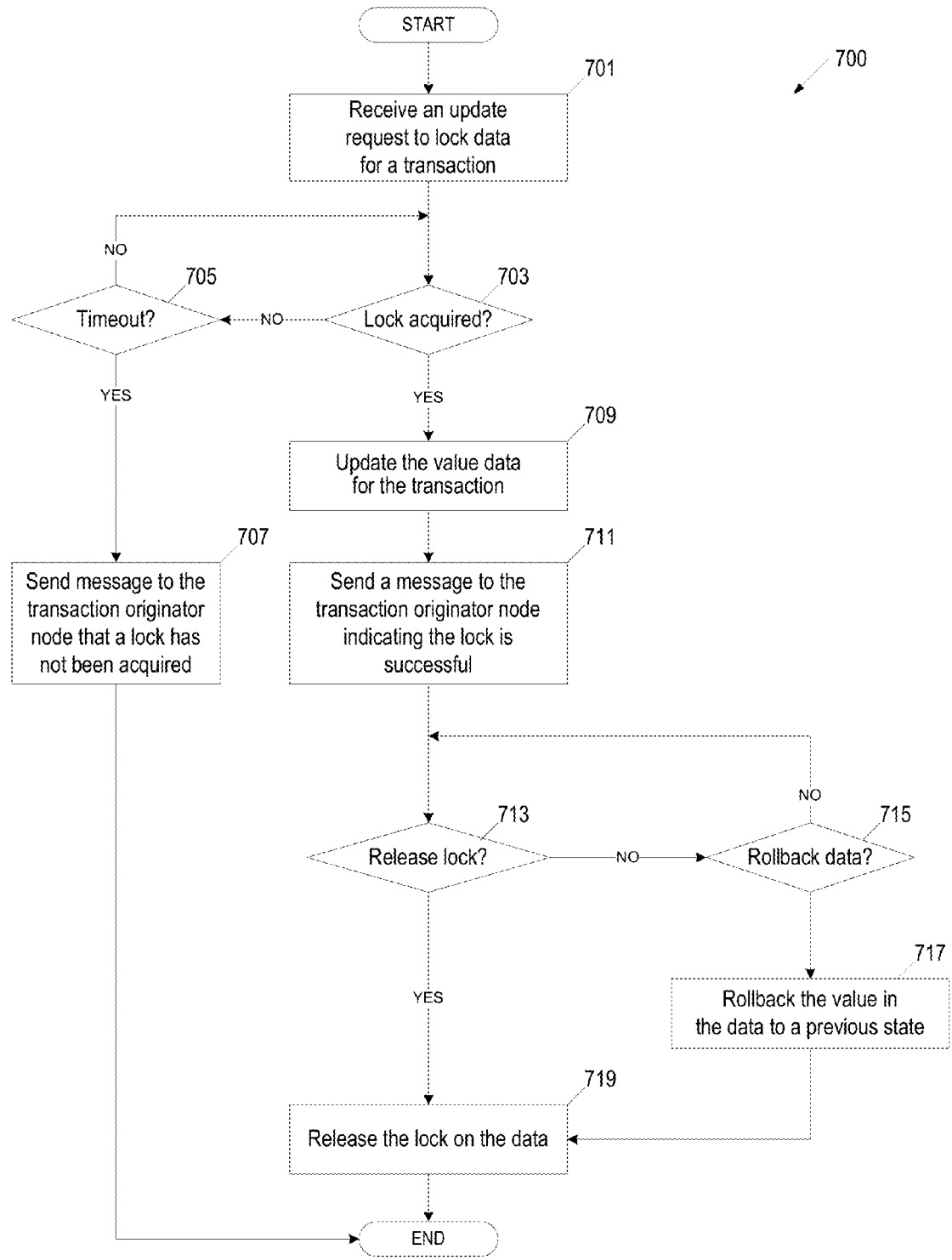
FIG. 7 is a flow diagram illustrating an embodiment for a method of locking transaction data based on a locking order to avoid transaction deadlock.

FIG. 7 is a flow diagram of another embodiment of a method 700 of an enlisted node locking transaction data based on a locking order to avoid transaction deadlock. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by a data update module 175 in an enlisted node 125C executing in a machine 107, an enlisted node 125D executing in a machine 109, and/or an enlisted node 125E executing in a machine 111 of FIG. 1.

At block 701, processing logic receives an update request to lock and/or update data for a transaction. The request can be received from a transaction originator node. Processing logic can receive the update request via a network call over the network. Processing logic may receive another update request from a different transaction originator node for a different transaction that uses the same transaction data during the execution of method 700 and may add the request to a queue.

At block 703, processing logic attempts to lock the data. If a lock is not acquired (block 703), processing logic waits and determines whether a timeout period has expired at block 705. If the timeout period has not expired (block 705), processing logic continues to wait at block 703. If the timeout period has expired (block 705), processing logic sends a message to the transaction originator node indicating a lock has not been acquired at block 707. If a lock is acquired (block 703), processing logic updates the value in the data for the transaction using the key-pair received in the update request at block 709. The request can include the key that corresponds to the data that should be locked and the corresponding new value for the key.

At block 711, processing logic sends a message to the transaction originator node indicating that the data has been locked and/or updated. At block 713, processing logic determines whether to release the lock. Processing logic may receive a message from the transaction originator node to release the lock. If a message to release the lock is not received (block 713), processing logic determines whether a message to rollback the data is received at block 715. Processing logic may receive a message from the transaction originator node to rollback the data. If a message to rollback the data is not received (block 715), processing logic returns to block 713. If a message to rollback the data is received (block 715), processing logic rolls back the data to a previous state at block 717. If a message to release the lock is received (block 713) or if the data has been rolled back (block 717), processing logic release the lock on the data at block 719.

Processing logic may receive another update request to update for another transaction that uses the same data as the first transaction and/or processing logic may determine that there is an update request in the queue to update data for another transaction that uses the same data as the first transaction. Processing logic may execute method 700 for the next update request.

Figure 8:
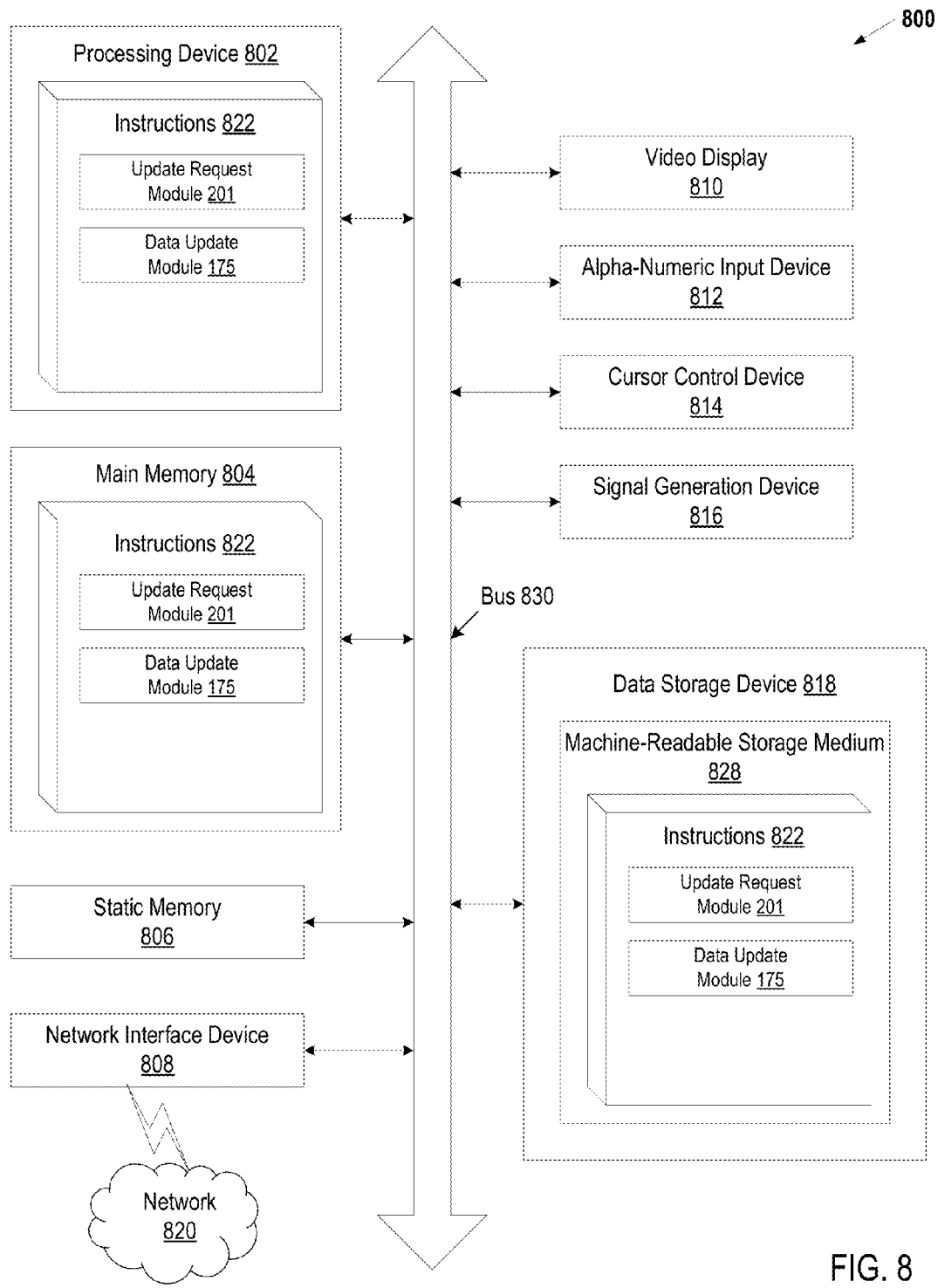
FIG. 8 is a block diagram of an exemplary computer system that may perform one or more of the operations described herein.

FIG. 8 illustrates a representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one embodiment, the instructions 822 include instructions for an update request module (e.g., update request module 201 of FIG. 2) and/or a data update module (e.g., data update module 175 of FIG. 1) and/or a software library containing methods that call modules in an update request module and/or a data update module. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sending" or "creating" or "receiving" or "caching" or "acquiring" or "updating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   identifying, by a processing device executing a transaction originator node, a plurality of data elements distributed at a plurality of enlisted nodes to lock for a multi-operational transaction, wherein the transaction originator node manages the multi-operational transaction, the multi-operational transaction comprising a plurality of operations, the plurality of data elements corresponding to the plurality of operations;

determining, by the processing device, a hash value for each of the plurality of enlisted nodes using a node identifier of a respective enlisted node;

ranking, by the processing device, the plurality of enlisted nodes in view of the hash values to create a lock order for the multi-operational transaction;

determining, by the processing device executing the transaction originator node, which of the plurality of enlisted nodes is a first enlisted node in the lock order for the multi-operational transaction;

sending, by the processing device executing the transaction originator node, an update perform request to the first enlisted node in the lock order to lock a corresponding data element residing at the first enlisted node from the plurality of data elements; and sending, by the processing device executing the transaction originator node, update cache requests to remaining enlisted nodes in the lock order to cache a corresponding update cache request until the corresponding remaining enlisted node receives an update perform message to perform a lock on a corresponding data element.

2. The method of claim 1, wherein the update perform request and the update cache requests comprise:
at least one of a request to update data, an identifier of the data to be updated, or a value to use to update the data.

3. The method of claim 1, wherein sending the update perform request to the first enlisted node comprises:
creating an indicator in the update perform request indicating to the first enlisted node to lock a data element residing at the first enlisted node from the plurality of data elements.

4. The method of claim 1, wherein sending the update cache requests to remaining enlisted nodes comprises:
creating an indicator in the update cache requests indicating to the remaining enlisted nodes to cache a corresponding update cache request.

5. The method of claim 1, wherein the remaining enlisted nodes receive an update perform message to perform the lock from an enlisted node that has performed a lock to a data element residing at the corresponding enlisted node.

6. The method of claim 1, further comprising:
receiving a message from a last enlisted node in the lock order that the data element residing at the last enlisted node is locked; and
sending a message to the first enlisted node and the remaining enlisted nodes to release the locks.

7. A method comprising:
receiving, by a processing device executing an enlisted node, an update request message from a transaction originator node identifying data to lock for a transaction at the enlisted node and a data update to perform by the enlisted node;

determining, by the enlisted node, that a flag in the update request message is disabled, the disabled flag indicating to the enlisted node to store the update request message in a cache without acquiring a lock or performing the data update;

caching, by the enlisted node, the update request message without acquiring a lock or performing the data update;

receiving, by the enlisted node, an update perform message to perform the data update as specified in the update request message that is stored in the cache; and acquiring the lock on the data and performing the data update as specified in the update request message.

8. The method of claim 7, wherein the update request message comprises:
lock order for the transaction identifying the order of the first enlisted node and the remaining enlisted nodes.

9. The method of claim 7, further comprising:
sending a message indicating the data has been locked.

10. A non-transitory computer-readable storage medium including instructions that, when executed by a processing device, cause a transaction originator node executing on the processing device to:

identify, by the transaction originator, a plurality of data elements distributed at a plurality of enlisted nodes to lock for a multi-operational transaction, wherein the transaction originator node manages the multi-operational transaction, the multi-operational transaction comprising a plurality of operations, the plurality of data elements corresponding to the plurality of operations;

determine a hash value for each of the plurality of enlisted nodes using a node identifier of a respective enlisted node;

rank the plurality of enlisted nodes in view of the hash values to create a lock order for the multi-operational transaction;

determine, by the transaction originator node, which of the plurality of enlisted nodes is a first enlisted node in the lock order for the multi-operational transaction;

send, by the transaction originator node, an update perform request to the first enlisted node in the lock order to lock a corresponding data element residing at the first enlisted node from the plurality of data elements; and send, by the transaction originator node, update cache requests to remaining enlisted nodes in the lock order to cache a corresponding update cache request until the corresponding remaining enlisted node receives an update perform message to perform a lock on a corresponding data element.

11. The non-transitory computer-readable storage medium of claim 10, wherein the update perform request and the update cache requests comprise:
at least one of a request to update data, an identifier of the data to be updated, or a value to use to update the data.

12. The non-transitory computer-readable storage medium of claim 10, wherein to send the update perform request to the first enlisted node comprises the processing device to:
create an indicator in the update perform request indicating to the first enlisted node to lock a data element residing at the first enlisted node from the plurality of data elements.

13. The non-transitory computer-readable storage medium of claim 10, wherein to send the update cache requests to remaining enlisted nodes comprises:
creating an indicator in the update cache requests indicating to the remaining enlisted nodes to cache a corresponding update request.

14. The non-transitory computer-readable storage medium of claim 10, wherein the remaining enlisted nodes receive an update perform message to perform the lock from an enlisted node that has performed a lock to a data element residing at the corresponding enlisted node.

15. The non-transitory computer-readable storage medium of claim 10, wherein the processing device is further to:

receive a message from a last enlisted node in the lock order that the data element residing at the last enlisted node is locked; and send a message to the first enlisted node and the remaining enlisted nodes to release the locks.

16. A system comprising:

a memory; and a processing device executing a transaction originator node in a data grid, the processing device coupled to the memory to:

identify, by the transaction originator node, a plurality of data elements distributed at a plurality of enlisted nodes to lock for a multi-operational transaction, wherein the transaction originator node manages the multi-operational transaction, the multi-operational transaction comprising a plurality of operations, the plurality of data elements corresponding to the plurality of operations;

determine a hash value for each of the plurality of enlisted nodes using a node identifier of a respective enlisted node;

rank the plurality of enlisted nodes in view of the hash values to create a lock order for the multi-operational transaction;

determine which of the plurality of enlisted nodes is a first enlisted node in the lock order for the multi-operational transaction;

send an update perform request to the first enlisted node in the lock order to lock a corresponding data element residing at the first enlisted node from the plurality of data elements; and send update cache requests to remaining enlisted nodes in the lock order to cache a corresponding update cache request until the corresponding remaining enlisted node receives an update perform message to perform a lock on a corresponding data element.

17. The system of claim 16, wherein to send the update perform request to the first enlisted node comprises the processing device to:

create an indicator in the update perform request indicating to the first enlisted node to lock a data element residing at the first enlisted node from the plurality of data elements.

18. The system of claim 16, wherein to send the update cache requests to remaining enlisted nodes comprises the processing device to:

create an indicator in the update cache requests indicating to the remaining enlisted nodes to cache a corresponding update cache request.

19. The system of claim 16, wherein the remaining enlisted nodes receive an update perform message to perform the lock from an enlisted node that has performed a lock to a data element residing at the corresponding enlisted node.

20. The system of claim 16, wherein the processing device is further to:

receive a message from a last enlisted node in the lock order that the data element residing at the last enlisted node is locked; and send a message to the first enlisted node and the remaining enlisted nodes to release the locks.

* * * * *